(12) United States Patent
Mo et al.

(10) Patent No.: US 8,885,631 B2
(45) Date of Patent: Nov. 11, 2014

(54) MULTIUSER DETECTION ENABLED MEDIUM ACCESS CONTROL IN MOBILE AD HOC NETWORKS

(75) Inventors: Shaomin Mo, Montville, NJ (US); John A. Gu, Rockaway, NJ (US); Ming Luo, Fairfax, VA (US); Reza Ghanadan, Berkeley Heights, NJ (US); Joseph Farkas, Merrimack, NH (US); John A. Tranquilli, Jr., Merrimack, NH (US)

(73) Assignee: Collison Communications, Inc., Peterborough, NH (US)

( * ) Notice: Subject to any disclaimer, the term of this patent is extended or adjusted under 35 U.S.C. 154(b) by 676 days.

(21) Appl. No.: 13/017,819

(22) Filed: Jan. 31, 2011

(65) Prior Publication Data
US 2012/0250629 A1 Oct. 4, 2012

Related U.S. Application Data

(60) Provisional application No. 61/327,902, filed on Apr. 26, 2010, provisional application No. 61/327,907, filed on Apr. 26, 2010.

(51) Int. Cl.
| | |
|---|---|
| *H04J 3/06* | (2006.01) |
| *H04L 12/28* | (2006.01) |
| *H04L 1/16* | (2006.01) |
| *H04W 56/00* | (2009.01) |
| *H04L 1/00* | (2006.01) |
| *H04W 28/04* | (2009.01) |
| *H04W 72/12* | (2009.01) |
| *H04B 7/26* | (2006.01) |

(52) U.S. Cl.
CPC ........... *H04W 56/002* (2013.01); *H04L 1/1607* (2013.01); *H04W 28/04* (2013.01); *H04W 72/12* (2013.01); *H04L 1/0079* (2013.01); *H04B 7/2656* (2013.01); *H04W 56/0015* (2013.01)
USPC .......................................... 370/350; 370/400

(58) Field of Classification Search
None
See application file for complete search history.

(56) References Cited

U.S. PATENT DOCUMENTS

| | | | |
|---|---|---|---|
| 7,016,371 B1 * | 3/2006 | Petranovich | .................. 370/445 |
| 7,245,673 B2 | 7/2007 | MacLeod | |

(Continued)

FOREIGN PATENT DOCUMENTS

| | | |
|---|---|---|
| EP | 1638265 A1 | 3/2006 |
| JP | 2000-252918 A | 9/2000 |
| WO | 2000-71843 A2 | 11/2000 |

OTHER PUBLICATIONS

Draft Standard for Local and Metropolitan Area networks, Part 16: Air Interface for Broadband Wireless Access Systems, IEEE Standard P802, Mar. 16, 2007. See figure 262; section 6.1, 8.4.4, 8.4.7, 8.4.10, 6.3.17.2.

(Continued)

*Primary Examiner* — Jutai Kuo

(57) ABSTRACT

A method of providing medium access control for a wireless mobile ad hoc network includes defining a TDMA network timing frame including a data (DATA) zone having one or more time slots structured to support multiuser detection (MUD) of concurrent transmissions during each slot, a negative acknowledgment (NACK) zone during which nodes transmit requests for retransmission of packets destined to but not successfully received by the nodes, a broadcast (BC) zone during which network management messages are broadcast to the nodes, and a control (CTRL) zone. A primary master (PM) node is selected and operates as a source of network time for all the nodes. Each node synchronizes its time to that of the PM node during the CTRL zone in a distributed manner, by exchanging control messages with the PM node or other nodes located one or more hops from the PM node.

22 Claims, 4 Drawing Sheets

(56) References Cited

U.S. PATENT DOCUMENTS

| | | | |
|---|---|---|---|
| 2002/0070845 | A1 | 6/2002 | Reisinger et al. |
| 2002/0163978 | A1* | 11/2002 | Doetsch et al. ............... 375/316 |
| 2003/0012176 | A1 | 1/2003 | Kondylis et al. |
| 2005/0192037 | A1 | 9/2005 | Nanda |
| 2005/0201340 | A1 | 9/2005 | Wang et al. |
| 2006/0215611 | A1 | 9/2006 | Nakagawa et al. |
| 2008/0268855 | A1* | 10/2008 | Hanuni et al. ................ 455/445 |
| 2009/0185489 | A1 | 7/2009 | Ruffini et al. |
| 2009/0201860 | A1 | 8/2009 | Sherman |
| 2009/0213815 | A1 | 8/2009 | Sherman et al. |
| 2009/0262710 | A1* | 10/2009 | Doi et al. ...................... 370/336 |
| 2009/0310619 | A1 | 12/2009 | Brommer |
| 2009/0313310 | A1* | 12/2009 | Thome et al. ................. 707/203 |
| 2010/0008247 | A1* | 1/2010 | Kwon et al. ................... 370/252 |
| 2010/0011231 | A1* | 1/2010 | Banerjea et al. ............. 713/320 |
| 2010/0054228 | A1 | 3/2010 | Michaels |
| 2010/0265955 | A1* | 10/2010 | Park et al. ..................... 370/400 |
| 2011/0051674 | A1 | 3/2011 | Niedzwiecki et al. |
| 2012/0106522 | A1* | 5/2012 | Reumerman et al. ......... 370/337 |

OTHER PUBLICATIONS

Search Report dated Feb. 8, 2012 for co-pending PCT Application No. PCT/US11/033353.

JP Office Action dated Nov. 29, 2011 against JP Patent Application No. 2009-098246; translation by Meisei International Patent Firm.

EP Office Action dated Jan. 18, 2011 against (related) EP Patent Application No. 03817679.8; BAE Systems Information and Electronic Systems Integrations, Inc. (Applicant).

Baines, S.J. et al., "Double window multi-user detection for asynchronous DS-CDMA", IEEE 1996, Electronic Letters, Nov. 21, 1996, vol. 32, No. 24, pp. 2199-2201.

Damnjanovic, A. et al., "Iterative Multiuser Detection/Decoding for Turbo Coded CDMA Systems", IEEE Communications Letters, vol. 5, No. 3, Mar. 2001, pp. 104-106.

Wang, X. et al., "An Overlapping Window Decorrelating Multiuser Detector for DS-CDMA Radio Channels", IEEE Transactions on Communications, vol. 49, No. 8, Aug. 2001, pp. 1488-1495.

K. Kusume, et al, Medium Access in Spread-Spectrum Ad Hoc Networks with Multiuser Detection, EURASIP Journal on Advances in Signal Processing (2009).

J. Zhang, et al, Multiuser Detection Based MAC Design for Ad Hoc Networks, IEEE Transactions on Wireless Communications, vol. 8, No. 4 (Apr. 2009).

S. Mo, et al, Distributed Scheduler Design for Multiuser Detection Enabled Wireless Mobile Ad-hoc Networks, IEEE MILCOM (Oct. 2010).

J. Farkas, et al, Power Aware Scheduling and Power Control Techniques for Multiuser Detection Enabled Wireless Mobile Ad-hoc Networks, IEEE MILCOM (Oct. 2010).

Y. Eisenberg, et al, MUD Enabled Media Access Control for High Capacity, Low-Latency Spread Spectrum Communications, IEEE MILCOM (Oct. 2007).

U.S. Non-Final Office Action mailed Jan. 17, 2013 for related U.S. Appl. No. 13/090,435, filed Apr. 20, 2011, references cited herein.

International Preliminary Report on Patentability for corresponding PCT patent application No. PCT/US2011/033353 filed Apr. 21, 2011.

Borgonovo, et al., "ADHOC MAC: A New, Flexible, and Reliable MAC Architecture for Ad-Hoc Networks," IEEE WCNC, New Orleans, LA, Mar. 2003, 5 pages.

Learned, R., et al., "Interference Multiple Access Wireless Network Demonstraction Enabled by Real-Time Multiuser Detection," IEEE Radio and Wireless Symposium, Jan. 2008, Orlando, Florida, pp. 523-526.

Bouharras, M., et al., "Scheduling Optimization in Multiuser Detection Based MAC Design for Networks," IEEE LCN, 33rd IEEE Conference on Local Computer Networks, Oct. 14-17, 2008, Montreal, Canada, pp. 655-660.

\* cited by examiner

MULTIUSER DETECTION ENABLED MEDIUM ACCESS CONTROL IN MOBILE AD HOC NETWORKS

CROSS-REFERENCE TO RELATED APPLICATIONS

The present application claims priority under 35 U.S.C. Section 119(e) of U.S. Provisional Patent Applications No. 61/327,902, filed Apr. 26, 2010, and titled "Multiuser Detection Enabled Medium Access Control In Mobile Ad Hoc Networks", and No. 61/327,907 also filed Apr. 26, 2010, and titled "Distributed Scheduler Design for Multiuser Detection Enabled Wireless Mobile Ad Hoc Networks". Both of the mentioned '902 and '907 applications are incorporated by reference.

STATEMENT OF GOVERNMENT INTEREST

This invention was made with United States Government support under Contract No. W15P7T-06-C-P423 awarded by the United States Army. The United States Government has certain rights in this invention.

BACKGROUND OF THE INVENTION

1. Field of the Invention

The present invention relates to mobile ad hoc networks, and particularly to medium access control by nodes in such networks.

2. Discussion of the Known Art

Increasing the spectral efficiency of a wireless communications network is a constant challenge. Most military and commercial applications require wireless networks to operate reliably in dynamically changing environments while maintaining high rates of data transmission over established links. Due to limitations in hardware capability at the physical (PHY) layer, wireless communications networks typically operate under an interference avoidance protocol. Such a protocol presents a major hurdle to increasing spectral efficiency, however.

So-called multiuser detection (MUD) techniques have improved spectral efficiency by increasing spectrum reuse within a given network, and most MUD research to date is directed at the PHY network layer. MUD enabled medium access control (MAC) for mobile ad hoc networks (MANETs) has appeared in the literature only recently, and focuses on fairness of medium access. See, e.g., K. Kusume, et al., "Medium Access in Spread-Spectrum Ad Hoc Networks with Multiuser Detection," Eurasip Journal on Advances in Signal Processing" (2009); and J. Zhang, et al., "Multiuser Detection Based MAC Design for Ad Hoc Networks," IEEE Transactions On Wireless Communications, vol. 8, no. 4 (April 2009) at pages 1836-46; both of which publications are incorporated by reference. Moreover, most MAC layer studies rely on the Global Positioning System (GPS) for synchronization in MANETs.

In Kusume, et al., supra, the authors propose a multiple access scheme in MUD enabled systems to resolve the so-called hidden-node problem. A timing frame is proposed having four zones, two of which called ANN (announcement) and OBJ (objection) serve a function similar to that of the known RTS/CTS (request-to-send/clear-to-send signaling protocol defined in the IEEE 802.11 wireless standard. In Zhang, et al., supra, the authors propose a two-stage RTS/CTS scheduling scheme to achieve a distributed spread spectrum code assignment among the network nodes.

In addition to fairness of channel access, a MAC scheme for use in tactical situations must consider many other requirements, for example, synchronization without using GPS or infrastructure, overhead efficiency, optimization of dynamic resource allocation, support for dense topologies, mobility, scalability, and quality of service (QoS). Little work has been reported on system designs or implementations that address these concerns, however. Making the task even more challenging is the fact that some of these requirements conflict with one another. For example, high channel efficiency (ratio of time for application data vs. time for non-application data) often conflicts with QoS, and contention based RTS/CTS access protocols cannot support QoS, especially in densely deployed networks.

Contention based access approaches also face the challenge of having to balance between high channel efficiency which usually requires relatively short time periods for RTS/CTS signaling and longer time periods for DATA transmission, and scalability which requires relatively long time periods for RTS/CTS signaling to resolve access collisions in densely deployed networks. Any network timing scheme that does not consider and balance such requirements would have limited utility.

A program developed under the Defense Advanced Research Projects Agency (DARPA) and known as the DARPA Interference Multiple Access (DIMA) Communications program, involves a real time prototype communication system that exploits MUD techniques to allow multiple simultaneous transmissions, thus resulting in higher spectral efficiency. DIMA operates in an ad hoc fashion without a need for infrastructure or central controllers, or relying on GPS. Moreover, DIMA has demonstrated more than a threefold improvement in spectral efficiency compared to IEEE 802.11. At low signal to noise ratios (SNRs), a DIMA radio is known to have achieved a packet error rate (PER) of less than one percent. See, Y. Eisenberg, et al., "MUD Enabled Media Access Control for High Capacity, Low-latency Spread Spectrum Communications," IEEE MILCOM, Orlando, Fla. (October 2007), which publication is incorporated by reference.

SUMMARY OF THE INVENTION

According to the invention, a method of providing medium access control for a wireless mobile ad hoc communications network includes defining a network timing frame having a number of zones, allocating a first or data (DATA) zone in the frame during which application data is transmitted and received among the nodes, allocating a second or negative acknowledgment (NACK) zone in the timing frame during which certain nodes of the network transmit requests for retransmission of data packets destined to but not successfully received by the nodes, and allocating a third or broadcast (BC) zone in the timing frame during which network management messages concerning node topology, message routing or network maintenance are provided to the nodes.

The inventive method also includes defining a primary master (PM) or root node, operating the PM node as a source of network time for all nodes of the network; and allocating a fourth or control (CTRL) zone in the timing frame during which a given node synchronizes its time in a distributed manner to the time of the PM node by exchanging control messages with the PM node or other nodes one or more hops away from the PM node.

In the disclosed embodiment, the network timing frame is structured as a time domain multiple access (TDMA) frame with a determined number of time slots for each zone, and one or more time slots in the data zone of the frame are capable of supporting multiuser detection (MUD) of concurrent data transmissions during each slot.

For a better understanding of the invention, reference is made to the following description taken in conjunction with the accompanying drawing and the appended claims.

DETAILED DESCRIPTION OF THE INVENTION

The present invention concerns a medium access control (MAC) scheme for mobile ad hoc networks (MANETs). A network timing frame structure that is particularly well suited for multiuser detection (MUD) enabled MANETs is detailed below. Experimental results are also disclosed.

DIMA Requirements

Figure 1:
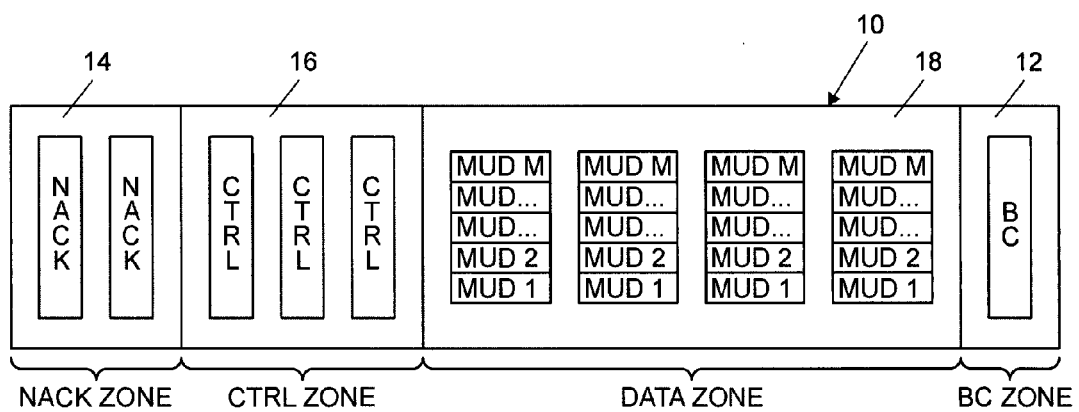
FIG. 1 is a representation of a network timing frame for a wireless mobile ad hoc network (MANET) according to the invention.

The earlier mentioned DIMA program requires that a mobile ad hoc network have the following attributes:
MUD support
High channel efficiency
Low latency
Mobility
Scalability
QoS
Fairness
Broadcast Capability
No central controller
No requirement for GPS
Radios constructed to operate according to DIMA should also have the following features:
Half-duplex wireless transceiver operation on a single frequency band
Less than one percent (1%) packet error rate (PER) on MUD reception FIG. 1 shows a network timing frame 10 for a wireless mobile ad hoc network (MANET) according to the invention. The timing frame 10 includes a first or broadcast (BC) zone 12, a second or negative acknowledgment (NACK) zone 14, a third or control (CTRL) zone 16, and a fourth or DATA zone 18, all of which zones are provided for corresponding network operations as described further below. The frame 10 is basically a time domain multiple access (TDMA) frame wherein sub-frames are defined taking the following considerations into account, namely, (1) coarse synchronization among nodes of the network is required for MUD reception, (2) in a MANET environment, a TDMA frame structure provides better network capacity and can support resource allocations to meet QoS requirements, and (3) with appropriate scheduling, a TDMA frame will ensure minimum channel access in a high contention environment.

Depending on their function in the MAC layer of a wireless network, data transmissions usually lie in one of three categories, viz., network entry, network management, and message traffic. Network entry data is produced when a node joins an existing network, and this event is generally unpredictable. Network management data includes time synchronization, topology control, routing path creation, and maintenance. In order to adapt to changes in network topology, management messages should be broadcast periodically to all nodes of the network. In addition, resource allocation has to be accommodated. Message or traffic data may be considered as randomly generated and lasting for relatively long time periods of time.

Frame Structure

To accommodate the different categories of data, the timing frame 10 of FIG. 1 includes the BC zone 12, the NACK zone 14, the CTRL zone 16, and the DATA zone 18. Each zone contains a configurable number of time slots. To reduce latency, available time slots can be physically intermingled among the zones within a given frame 10. Each zone has an access scheme that depends on the nature of the data or messages that are associated with the zone.

Network management messages typically vary in size based on the network topology at any given time. According to the invention, the BC zone 12 of the timing frame 10 is dedicated for the transmission of network layer management messages, thereby enabling the management messages to be processed by an IP layer fragmentation function.

Also, according to the invention, the NACK zone 14 is allocated in the timing frame 10 for implementing a negative acknowledgment (NACK) scheme wherein each receiving node sends a NACK packet to the corresponding transmitting node in each frame only to identify any traffic packets that were not successfully received at the receiving node during a prior frame. If all packets addressed to the receiving node in a given frame are successfully received, then no NACK signal is sent by the receiving node. As packet errors tend to occur infrequently and randomly, the inventive NACK scheme results in lower network overhead for acknowledgment than the overhead needed to support existing ACK signaling schemes.

Further, when a transmitting node is sending traffic to a receiving node during the DATA zone 18, it monitors during the NACK zone 14 for any NACK packets from the receiving node. If the receiving node receives any packets in error within the DATA zone 18, it randomly selects one time slot in the NACK zone 14 of a subsequent time frame in which to transmit its NACK response. If one node is both transmitting and receiving data during the DATA zone 18, and some received packets are in error, the node randomly selects one time slot in the NACK zone 14 in which to transmit its NACK response while monitoring the remaining slots in the NACK zone 14. In the event requests for retransmission of unsuccessfully received data packets are not received by the nodes that transmitted the packets after a determined time, a known MAC data unit (MDU) retransmission operation may be implemented by the network instead.

Additionally, the NACK zone 14 handles network entry messages originating from outside nodes that desire to join the network. The NACK zone 14 preferably uses a simple carrier sense multiple access (CSMA) scheme such as CSMA/CA or slotted Aloha. In addition, certain urgent data requiring low latency may also be transmitted during the NACK zone 14.

The CTRL zone 16 handles control related messages from both the MAC layer and the network layer such as, e.g., resource allocation negotiation. In particular, the network layer messages need to be transmitted periodically in order for nodes of the network to adapt quickly to changes in network topology. To resolve contention from one-hop neighbor nodes and to avoid collisions from two-hop hidden nodes, the CTRL zone 16 preferably uses a distributed scheduling scheme, for example, a known node activated medium access (NAMA) protocol. See L. Bao, et. al, chapter titled "Distributed Channel Access Scheduling for Ad Hoc Networks" in Algorithms and Protocols for Wireless and Mobile Networks, CRC/Hall (2004), all relevant portions of which are incorporated by reference. Network entry messages originating from outside nodes that desire to join the network may instead be handled in the CTRL zone 16 rather than during the NACK zone 14, if desired for greater efficiency.

The DATA zone 18 uses MUD capability to handle application data, usually in the form of high volume streaming data. This type of data is typically unicast or multicast among the network nodes, and is of relatively long duration. Bandwidth needs and QoS requirements on throughput and latency are often presented, and could vary among different applications. A scheduling scheme is therefore applied to deliver this type of data so as to satisfy different QoS requirements. To guarantee reliable delivery of reservation negotiation messages, both resource reservation requests and acknowledgments are made by the nodes within the CTRL zone 16.

Distributed Synchronization

Many aspects of the network, such as MUD, NAMA and TDMA, require frame level synchronization (coarse synchronization). Given the requirement for DIMA radios to operate in tactical networks (where one-hop range is typically on the order of kilometers) without relying on GPS or using a central controller, a distributed synchronization scheme is preferably implemented to provide coarse synchronization.

A DIMA network uses a tree-based hierarchy structure for synchronization. A root node is defined and referred to as the Primary Master (PM) node. All nodes on the network use the PM node's time as a reference, either directly or indirectly. Hop count is defined as the number of hops from a given node to the PM node (the PM's hop count is zero). Nodes that are one hop away from the PM node adjust their time directly to that of the PM node. Nodes that are N hops away from the PM node each select a Direct Master (DM) node from among nodes that are N−1 hops away from the PM node, and adjust their time to synchronize with that of their selected DM nodes. One simple rule for choosing a DM node is to select the one-hop neighbor with the lowest hop count, or the lowest ID if multiple neighbor nodes have the same lowest hop count.

Any given node of the network announces the PM node, and the given node's DM node and hop count to the PM node in the given node's control messages. At the same time, each node monitors the other nodes' control messages for changes in these values. Except for the PM node, each node adjusts its time to align with its DM node.

Given that a multi-tier hierarchy is essential for scaling a distributed network, and that mobile nodes can lose network connectivity either temporarily or permanently, it is essential that the hierarchy to be able to self-form systematically and autonomously, and to self-heal. For example, when the PM node loses its connection with the network, a new PM node must be determined, and each remaining node must re-select its DM node and adjust its hop-count and time accordingly.

Specifically, an abrupt change in a given node's time may occur when the node selects a different DM node. For example, suppose both nodes n and m initially share the same DM node, node d. Then node n switches its DM node to node m. Node n's time offset to its new DM node time becomes $$\Delta t_{nm} = \Delta t_{nd} + \Delta t_{dm}.$$

where $\Delta t_{nm}$ denotes the time offset of node n to node m. In the worst case where $\Delta t_{nd}$ and $\Delta t_{dm}$ have the same sign, then $$|\Delta t_{nm}| = |\Delta t_{nd}| + |\Delta t_{dm}| \geq |\Delta t_{nd}|.$$

Moreover, lossy wireless channels can have a negative impact on the accuracy of time-offset estimations when a node changes its selected DM node.

Figure 2:
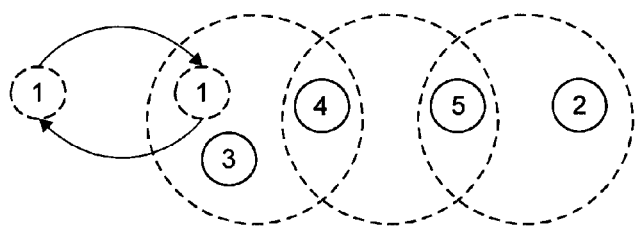
FIG. 2 illustrates the effect of node mobility on a change in network topology.

Accordingly, the process of selecting the PM node should be relatively simple, and changes among the selected DM nodes should be minimized. One way to maintain a hierarchy structure is always to elect the node with the lowest ID as the PM node, thereby effectively allowing a solution whenever a conflict occurs. Under certain circumstances, however, maintaining such a well-formed network may cause increased switching of DM nodes and frequent network topology changes. An example is shown in FIG. 2 to illustrate the problem. In the figure, node 1 is the initial PM node and the dashed circles represent one-hop radio ranges. When node 1 travels out of network coverage, node 3 assumes the role of the PM node first because node 3 detects node 1's absence, and node 3 has a lower ID than its immediate neighbor, node 4. When the updated information propagates to node 2, node 2 then assumes the role of a PM node because node 2's ID is lower than that of node 3. The new PM node information propagates back to node 3 through nodes 5, 4 and 3, all of which then re-select their DM nodes. Later, when node 1 travels back into the network, PM node status switches back to node 1, and all other nodes re-select their DM nodes again. Generally, there are fewer changes of DM nodes after partial changes in network topology (same PM node), than after greater topology changes (PM node hand off). The following rules will therefore effect a balance between ease of network operation, and minimal changes among selected DM nodes.

1. An entering node always joins an existing network as a slave. This prevents a change of the then existing PM node and selected DM nodes within the whole network upon the entry of one node. Therefore, in the example of FIG. 2, when node 1 re-joins the network while node 2 is the PM node, node 1 will not at once assume the role of a PM node, thus keeping the majority of the network synchronization intact.

2. If the PM node moves out of network, its absence is first detected by its one-hop neighbors. A new PM node is then elected only among the one-hop neighbor nodes. In the example of FIG. 2, when node 1 moves out of network, node 3 assumes the PM role. Thus, only node 4 changes its DM node, and the rest of the hierarchy is not affected.

3. To bring the synchronization hierarchy closer to a well formed topology, a hand off or change of a PM node occurs among one-hop neighbors when a neighbor has a lower ID than that of the current PM node. According to this rule, when node 1 re-joins the network while node 3 is the PM node, node 1 selects node 3 as its DM node first and sets its hop count as 1. Later, node 1 takes over the role of PM node, and node 3 and node 4 change their DMs while all other nodes keep their DMs unchanged.

Figure 3:
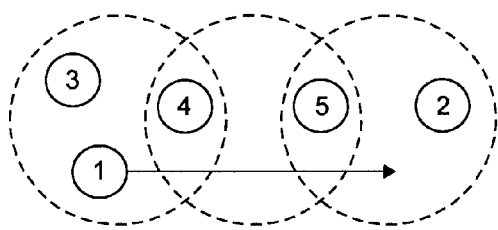
FIG. 3 illustrates movement of a primary master (PM) network node within a network.
Figure 4:
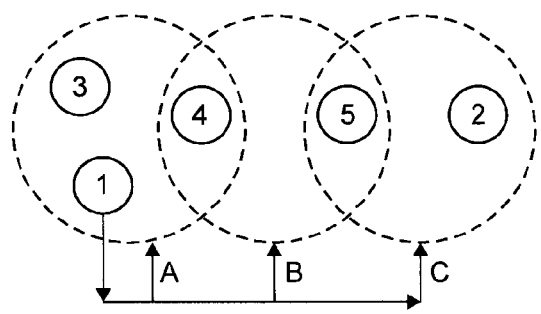
FIG. 4 illustrates movement of the PM node out of and then back into the network.

Two examples shown FIGS. 3 and 4 further illustrate the above operations. In FIG. 3, node 1 is the PM node which travels through the network from left to right. Node 1 keeps the role of PM node during its movement. Only those nodes within one-hop range of node 1 modify their DM nodes, while the DM nodes for all other nodes remain unchanged.

In FIG. 4, when node 1 moves out of the network, node 3 assumes the role of PM node. Later, when node 1 re-enters the network from location A, node 1 initially operates as a slave of node 3, and eventually assumes the role of a PM node. Node 1 then becomes a DM node for nodes 3 and 4. On the other hand, if node 1 re-enters the network from location B or location C, node 1 will select either node 4 or node 5 as its DM node, and set its hop count as either 2 or 3, accordingly. In both cases, node 1 maintains slave status as long as the remaining network topology stays the same.

Network Entry

After initialization, an entering node scans a wireless channel(s) to detect existing networks for a certain time period. If no network is detected, the node starts a new network by transmitting a beacon signal and identifying itself as the PM node during the NACK zone 14. At the same time, the node keeps monitoring the channel for other nodes attempting to join the network. If no such neighbor nodes are detected after a certain time, the node stops transmitting and returns to the channel scanning mode only. If a network is found, the node adjusts its time to that of the network, and joins the network.

Node joining is a typical issue in MANETs and has been addressed in many systems in similar ways. In a DIMA network, an entering node adjusts its time to align with that of the existing network. Then, a distributed, contention free scheduling scheme is used for the node to access the CTRL zone 16 and the BC zone 12.

Topology & Routing

As mentioned, regular transmissions in the BC zone 12 are based on distributed, contention free scheduling. In order to accomplish this, two-hop neighbor information is needed. If all nodes broadcast their list of one-hop neighbors, then all nodes can determine a list of their two-hop neighbors in a known manner.

In a DIMA network, a generic IP layer routing approach is employed to establish a routing path. As the IP layer is widely used in network communications, IP layer routing is platform independent and can be easily adopted in a vast array of systems.

Scheduling

Quality of service (QoS) is an important aspect of wireless network communications in most military and commercial systems. To meet various QoS requirements effectively and achieve channel efficiency, a known reservation based scheduling scheme is used in the DATA zone 18 of the frame 10 in FIG. 1. Details of the scheduling operation may be found, e.g., in S. Mo, et al., "Multiuser Detection Enabled Scheduling in MANET," IEEE MILCOM 2010, San Jose (October 2010), and J. Farkas, et al., "Power Aware Scheduling for Multiuser Detection Enabled MANET," IEEE MILCOM 2010, San Jose (October 2010), all relevant portions of which are incorporated by reference.

Specifically, a scheduler coordinates multiple concurrent transmissions in an ad hoc fashion that facilitates and exploits the MUD capability, by allocating available resources from multiple domains including time slots, slot durations, and MUD spread spectrum codes. The scheduler resolves common problems encountered in MANETs, for example, so-called hidden node and exposed node conditions. Some MUD specific requirements and restrictions are also considered, such as a near-far limitation that is alleviated by allocating resources to avoid using time slots that experience severe near-far interference. The scheduler also takes hardware constraints into account including half-duplex operation by maximizing the number of simultaneous receptions allowed in a given time slot, thereby resulting in high channel efficiency.

The network architecture is distributed in the sense that no infrastructure or central controllers are used, thus avoiding any single point of failure. The architecture has built-in scalability, and can be applied to large networks without increasing the overhead for network management or control.

Traffic Acknowledgment

Due to the generally unpredictable nature of wireless communications channels, packet losses will unavoidably occur. Using a multiuser detection (MUD) enabled DIMA PHY, a data packet error rate (PER) of below 1% can be managed even at low signal to interference and noise ratios (SINR). See Y. Eisenberg, et al., "MUD Enabled Media Access Control for High Capacity, Low-latency Spread Spectrum Communications," IEEE MILCOM, Orlando, Fla. (October 2007) all relevant portions of which are incorporated by reference. As mentioned, according to the invention, a negative acknowledgment (NACK) scheme is employed by which each destination node sends one NACK packet to the corresponding source node in each frame, only to identify any traffic packets that were not successfully received at the destination node. If all packets addressed to the destination node in a frame are successfully received, then no acknowledgment is sent. As packet errors occur infrequently and randomly, the NACK scheme results in a lower network overhead for acknowledgment than the overhead needed to support existing ACK signaling schemes.

Because a receiving node that receives any packets in error within the DATA zone 18 randomly selects one time slot in the NACK zone 14 of a later frame to transmit a NACK re-transmission request, it will be understood that contention and collisions may occur due to the random selection of a NACK zone time slot by the receiving node. The following two examples are given to help understand these effects on packet delivery. Both examples assume five slots in the DATA zone 18 and five codes in each time slot. For ease of analysis, only one slot is configured in the NACK zone 14 so that if multiple nodes transmit NACK re-transmission requests within the NACK zone 14, a collision occurs and no NACK response is detected by any transmitting node.

Example 1

20 Nodes

Each node transmits to another node using one slot-code. The probability of error for each received packet is PER(Rx) =1%. This is also the probability of each destination node generating a NACK response, or PER(NACK)=1%. The probability of more than one node detecting a packet error in the NACK zone 18 (the probability of a NACK collision, $P_{Cnack}$) would be $P_{Cnack} = 1 - 0.99^{20} - C_{20}^{1} * 0.99^{19} * 0.01 = 1.69\%.$ Example 2

10 Nodes

Each node transmits on two slots to another node. The probability of each destination node sending a NACK response equals the probability of any of the node's received packets being in error, or PER(NACK)=1.99%. In this case, $P_{Cnack}$ would be $$P_{Cnack}=1-0.9801^{20}-C_{10}{}^{1}*0.9801^{9}*0.0199=1.60\%$$

It can be shown that for the same frame structure as in FIG. 1 and the same retransmission limit but with different link patterns, a similar level of PER can be obtained. With more slots configured in the NACK zone 14, a much lower probability of missing a NACK response can be achieved. Preferably, IP layer retransmission is employed in case NACK responses are not delivered successfully to the source nodes of the associated data packets.

Scalability Analysis

DIMA networks are intended for use in variety of applications. The timing frame 10 therefore needs to support networks with a large number of nodes efficiently. In other words, channel efficiency and performance cannot degrade dramatically with increases in network size. Specifically, two scalability considerations include (1) the length of control messages is independent of the number of nodes in the network, and (2) the frequency of control message transmissions per node is inversely proportional to the number of nodes within two-hop range.

Network topology and routing messages increase linearly with network size. If properly fragmented, however, these messages can be transmitted in a relatively small slot. Fragmentation will reduce the rate of topology updates. Thus, for routing, increased network scalability may be obtained via a trade off with the frequency of topology messages. As discussed above, by the use of distributed contention free scheduling in the CTRL zone 16 and the BC zone 12 in the frame 10 of FIG. 1, no contention or collisions will occur for network management data in those zones. A relatively small CTRL zone 16 and BC zone 12 will only reduce the access rate without a dramatic drop in channel efficiency and performance as network size increases.

Channel Efficiency Analysis

Channel efficiency is defined as the ratio of time allocated for traffic data in a single frame, over the total time of the frame (i.e., the ratio of the length of DATA zone 18 in FIG. 1 to the entire length of the frame 10). For the DIMA experiments, the frame 10 was configured as shown in Table 1 below, resulting in a channel efficiency of 80%. For a network with 20 nodes, each node has an opportunity to transmit data in the CTRL zone 16 every 200 ms, worst case (all nodes located within two-hops). An initial latency for reservation negotiation (one reservation request and one reply) could also be as much as 200 ms. For a network with 30 nodes, each node gains access to the CTRL zone 16 in 300 ms and reservation negotiation takes 300 ms to perform, worst case.

TABLE 1

Network Configuration for 50 ms Frame Length

|  | Slot size | Slots | Total time |
|---|---|---|---|
| NACK Zone 14 | 1 ms | 2 | 2 ms |
| CTRL Zone 16 | 1 ms | 5 | 5 ms |
| DATA Zone 18 | 8 ms | 5 | 40 ms |
| BC Zone 12 | 3 ms | 1 | 3 ms |

QoS and Fairness

Assuming a non-overloaded network operating state, QoS for data traffic is guaranteed by the application of reservation based scheduling. Fairness of transmission for control messages from the nodes is provided by the adoption of distributed, contention-free access scheduling in the CTRL zone 16. This ensures the delivery of resource requests to all neighbors. And with cooperation among all nodes, fairness of data traffic can be achieved.

QoS and fairness are two competing requirements, however. In heavily loaded or over-loaded systems, an available resource may not be sufficient to accommodate all requests. DIMA does provide a platform to implement more sophisticated schedulers for deciding whether to deny a new request, or to preempt or degrade previously scheduled tasks in order to accommodate a new request.

Experimental Results

Extensive testing was conducted to evaluate the functionality and performance of the timing frame 10 in FIG. 1 in a DIMA network. Three real-time test results are given below, one for synchronization, and two for the application layer. For all tests, the frame 10 was configured as in Table 1 above. Intervals between state transitions in the synchronization test were configurable.

Figure 5:
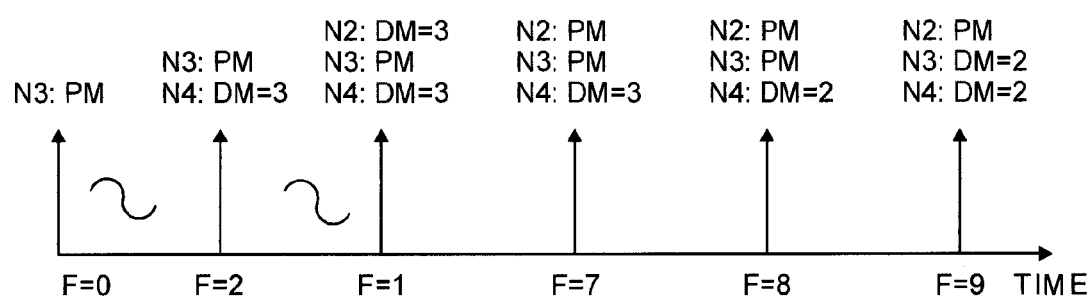
FIG. 5 depicts test results of network synchronization.

Three nodes were used in a synchronization test to demonstrate network creation and master migration. The frame 10 of FIG. 1 was configured to support ten nodes by using round-robin to govern access to the CTRL zone 16. In this way, each node was allowed to transmit a CTRL message every two frames. FIG. 5 graphically depicts the results of the test. First, node 3 (N3) was turned on. After 16 frames of detecting no activity, N3 created a network by identifying itself as a PM node and transmitting a corresponding CTRL message. During this time, node 4 (N4) was turned on and allowed to carry out the same process as N3, first listening for a network. N4 heard the CTRL message from N3, synchronized its clock to that of N3, and entered the network as a slave. The next opportunity for N4 to send a CTRL message was in frame 2, at which time N3 heard the message from N4 and the network was formed. Thirty frames later, N2 was activated and entered the network as a salve by selecting N3 as its DM node and the PM node.

The next opportunity for N2 to send a CTRL message announcing that it joined the network, was in the next frame. Note that in the present configuration, the maximum frame number (F) is 31, and F resets to zero after reaching a value of 31. Six frames later, N2 assumed the role of the PM node, and announced same in a CTRL message that was heard by N3 and N4. At the next frame, when N4 had an opportunity to send a CTRL message, N4 announced that it switched its PM node and DM node both to N2. Finally, in the next frame, N3 announced in the CTRL message that it surrendered its role as the PM node to N2.

Figure 6:
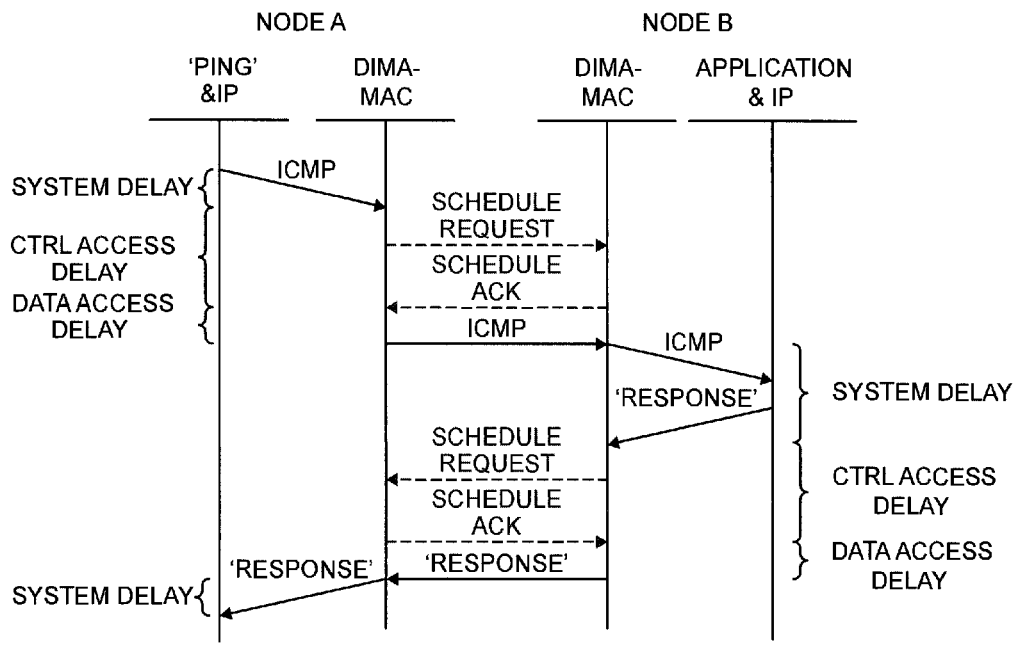
FIG. 6 illustrates a signaling protocol for a first "ping" according to the invention.

The next two tests were application tests to demonstrate how the network sets up data traffic reservations, and uses the reservations to send application layer data. The tests used "Ping", which is a known computer network utility to test whether or not a local host can reach a certain remote host across an IP network, and to measure the round-trip time for packets originating from the local host and addressed to the remote host. Ping tests cover most all major components of the MAC layer and the network layer. FIG. 6 is the flow chart of the protocol signaling for the ping tests.

In FIG. 6, for a single hop ping, node A sends an ICMP echo request to node B. Upon receipt, node B sends a response packet to node A. The dashed lines with arrows, i.e., Schedule Request and Schedule ACK, represent MAC protocol actions. The solid lines represent data traffic flowing either from the IP layer to the MAC layer (diagonal lines), or from one DIMA node to another (horizontal lines). Since the drawing is for illustrative purposes only, the length of the lines in FIG. 6 is not intended to correspond to actual delays.

Like the synchronization test, the frame 10 of FIG. 1 was configured to support ten nodes so that each node transmits a CTRL message every 100 ms. Without considering system latency, the maximum CTRL access delay for both the Schedule Request and the Scheduler ACK messages would be 100 ms. Hence, the total delay for one scheduling handshake is 200 ms, worst case. Since two schedule requests are involved in the round trip ping, the maximum total delay caused by the MAC could be 400 ms. After the reservation is established, only DATA zone access delay remains. In the worst case, one frame (50 ms) delay occurs for one direction data, and a two frame (100 ms) delay occurs for the round trip of ping.

Figure 7:
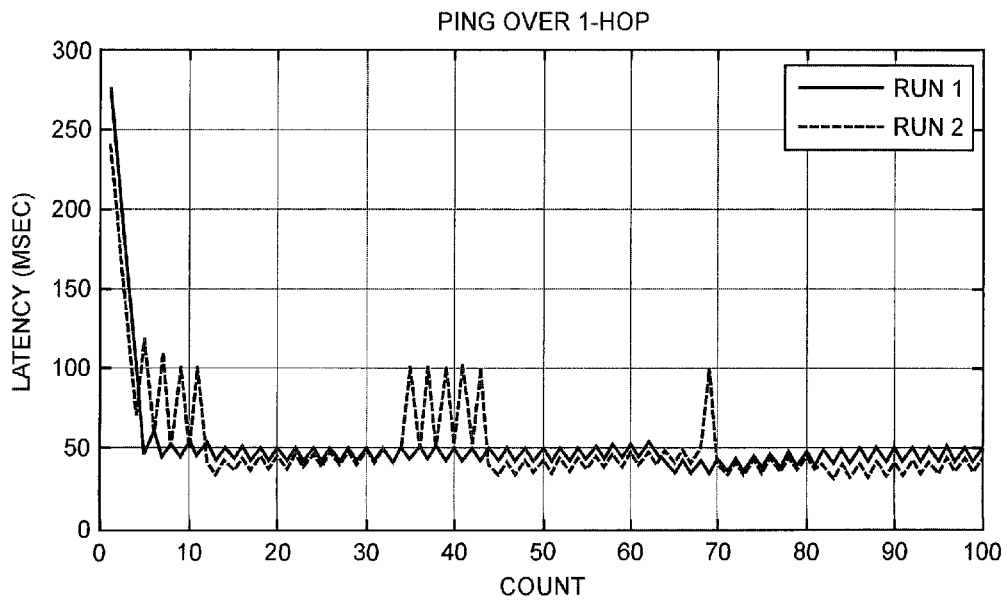
FIG. 7 is a graph depicting results of a one-hop ping according to the invention.

In these two tests, the ping application was configured to initiate response requests once every 50 ms. The results of two runs were collected and are shown in FIG. 7. Both results show that the latency starts at about 300 ms, and diminishes to about 50 ms. The two results conform to the above analysis.

A transition region lies between the initial and the stable phases. This occurs because during the initial scheduling negotiation, more packets are generated by ping and are stored in a queue. The network estimates packet transmission rate and calculates the number of additional slots needed to empty the accumulated queue. Once the queue starts to empty, the additional allocated slots are released. The spikes in the second test run shown in FIG. 7 relate to packets where the application layer sent packets to the MAC layer directly on the boundary of the MAC layer's allocated DATA slot. In those cases, the packet is held in an output queue until the next allocated slot, so an additional frame of latency (+50 ms) is incurred.

In both test runs, all responses to ICMPs were received and serviced, and there was no MAC layer packet loss or re-transmissions. Since latency is a metric for the application layer, the time from when a packet is generated is not necessarily aligned to the timing of the frame 10.

Figure 8:
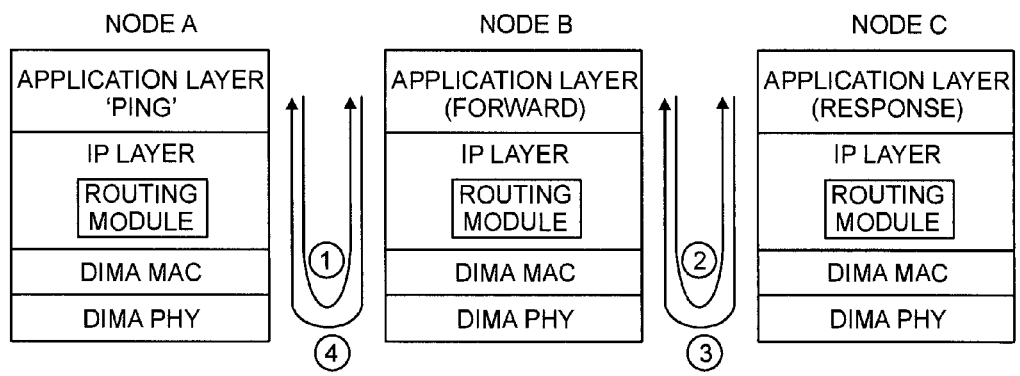
FIG. 8 is a block diagram representation of a two-hop ping according to the invention.

Two-hop pings involving packet flows are depicted in FIG. 8. Before multi-hop traffic can commence, a network routing protocol operates to enter next hop information in a routing table at each node, so as to enable the node to establish a link to a desired destination node. When node A pings node C, an ICMP echo request is sent to node B (circle 1) who then forwards it to destination node C (circle 2). Similarly node C's response is sent to node B (circle 3) who then forwards it to node A (circle 4). The above analysis on latency for one-hop pings applies to each leg in the case of two-hop pings. Therefore, the maximum initial delay would be 800 ms, and the maximum delay in stable-state would be 200 ms.

Figure 9:
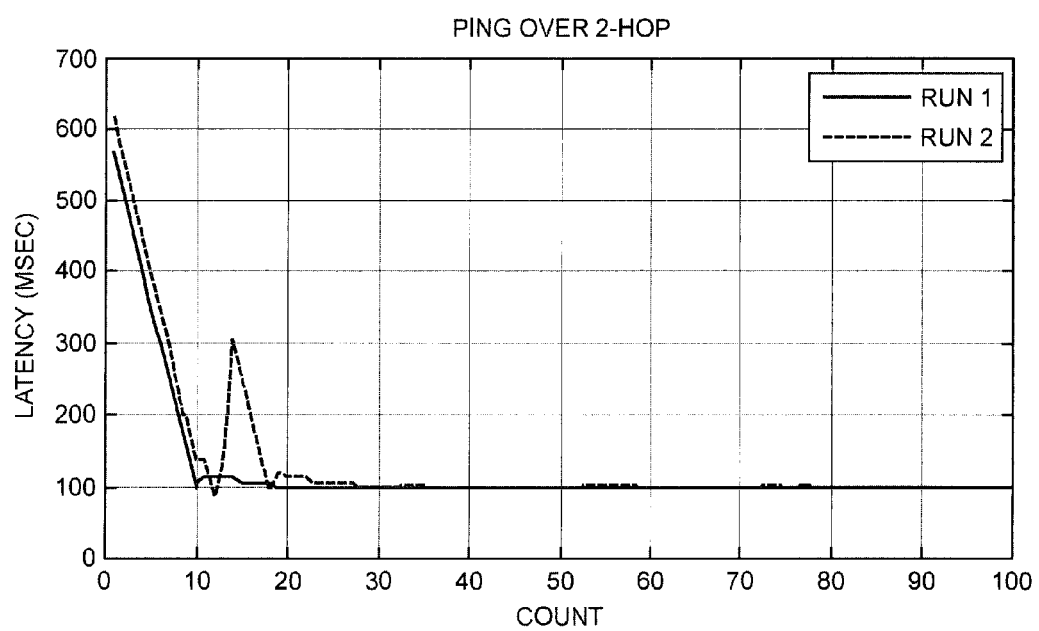
FIG. 9 is a graph showing results of the two-hop ping.

Results of the two test runs were collected and are shown in FIG. 9. Both results show that latency starts at about 600 ms and diminishes to about 100 ms. The two sets of results are almost double those obtained for the one-hop pings, which conforms to the above analysis. In the two-hop ping tests, small ripples were cancelled by the two hops so that smoother latencies were obtained.

The network timing frame 10 and architecture described herein overcome major problems in existing network MAC layers, and address key requirements for MANETs in tactical environments, particularly for MUD enabled or DIMA networks. Synchronization for wireless MANETs is achieved without the need for infrastructure or central controllers. Distributed scheduling provides channel access and resource allocation for different types of data with fairness and QoS, and the frame 10 has an ability to scale to accommodate large densely populated networks.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A method of providing medium access control (MAC) for a wireless mobile ad hoc network, comprising:
    defining a network timing frame having a number of zones;
    allocating a first or data (DATA) zone in the timing frame during which application data is transmitted and received among the nodes;
    allocating a second or negative acknowledgment (NACK) zone in the timing frame during which certain nodes of the network transmit requests for retransmission of data packets destined to but not successfully received by the nodes;
    structuring at least one time slot in the DATA zone to support multiuser detection (MUD) to decode multiple users from concurrent data transmissions received in a same time slot;
    allocating a third or broadcast (BC) zone in the timing frame during which network management messages concerning node topology, message routing or network maintenance are provided to the nodes;
    defining a primary master (PM) or root node and operating the PM node as a source of network time for all nodes of the network; and
    allocating a fourth or control (CTRL) zone in the timing frame during which a given node of the network synchronizes its time in a distributed manner to the time of the PM node by exchanging control messages with the PM node or with other nodes that are one or more hops away from the PM node.

2. The method of claim 1, including structuring the network timing frame as a time domain multiple access (TDMA) frame, and providing a determined number of time slots for each zone.

3. The method of claim 1, including applying a distributed contention free scheduling protocol for nodes desiring to transmit messages during the BC zone of the network timing frame.

4. The method of claim 3, including using a node activated medium access (NAMA) protocol for scheduling transmissions in the BC zone.

5. The method of claim 4, including applying a distributed contention free scheduling protocol for nodes desiring to schedule transmissions during the CTRL zone of the network timing frame.

6. The method of claim 1, including applying a distributed contention free scheduling protocol for nodes desiring to schedule transmissions during the CTRL zone of the network timing frame.

7. The method of claim 6, including using a node activated medium access (NAMA) protocol for the scheduling protocol.

8. The method of claim 1, including applying a collision avoidance protocol for nodes desiring to transmit messages during the NACK zone of the network timing frame.

9. The method of claim 1, including monitoring for requests for retransmission of unsuccessfully received data packets during the NACK zone of the network timing frame, at the nodes that originated the data packets during the DATA zone of a prior timing frame.

10. The method of claim 9, including implementing a MAC data unit (MDU) retransmission operation when the requests for retransmission of unsuccessfully received data packets are not received at the nodes that originated the data packets.

11. The method of claim 1, wherein an outside node desiring to join the network announces its identity during either one of the NACK and the CTRL zones of the network timing frame.

12. The method of claim 11, including designating the outside node as a slave with respect to neighboring nodes and the PM node of the network when the outside node initially enters the network, thereby preventing a sudden change of the existing PM node or an abrupt change in network time synchronization among nodes of the network.

13. A method of providing medium access control (MAC) for a wireless mobile ad hoc network, comprising:
    defining a network timing frame having a number of zones;
    allocating a first or data (DATA) zone in the timing frame during which application data is transmitted and received among the nodes;
    allocating a second or negative acknowledgment (NACK) zone in the timing frame during which certain nodes of the network transmit requests for retransmission of data packets destined to but not successfully received by the nodes;
    structuring at least one time slot in the DATA zone to support multiuser detection (MUD) to decode multiple users from concurrent data transmissions received in a same time slot;
    allocating a third or broadcast (BC) zone in the timing frame during which network management messages concerning node topology, message routing or network maintenance are provided to the nodes;
    defining a primary master (PM) or root node and operating the PM node as a source of network time for all nodes of the network;
    allocating a fourth or control (CTRL) zone in the timing frame during which a given node of the network synchronizes its time in a distributed manner to the time of the PM node by exchanging control messages with the PM node or with other nodes that are one or more hops away from the PM node; and
electing a new PM node only among one-hop neighbors of a current PM node when the current PM node moves outside of the network.

14. The method of claim 13, including handing off or changing the current PM node to the node having the lowest ID among one-hop neighbors of the current PM node.

15. A method of providing medium access control (MAC) for a multiuser detection (MUD) enabled wireless ad hoc network, comprising:
    defining a TDMA network timing frame;
    allocating a first or data (DATA) zone in the network timing frame having one or more time slots structured to support multiuser detection (MUD) of concurrent transmissions by nodes of the network during each slot;
    structuring at least one time slot in the DATA zone to support multiuser detection (MUD) to decode multiple users from concurrent data transmissions received in a same time slot;
    allocating a second or negative acknowledgment (NACK) zone in the timing frame during which nodes transmit requests for retransmission of packets destined to but not successfully received;
    allocating a third or broadcast (BC) zone in the timing frame during which network management messages are broadcast to the nodes;
    allocating a fourth or control (CTRL) zone in the timing frame during which nodes exchange control messages with one another; and
    selecting a primary master (PM) node and operating the PM node as a source of network time for all the nodes, wherein each node synchronizes its time to that of the PM node during the CTRL zone in a distributed manner by exchanging control messages with the PM node or other nodes located one or more hops from the PM node.

16. The method of claim 15, wherein outside nodes desiring to enter the network announce their identity during either one of the NACK and the CTRL zones of the network timing frame.

17. The method of claim 16, including designating the outside node as a slave with respect to neighboring nodes and the PM node of the network when the outside node initially enters the network, thereby preventing a sudden change of the existing PM node or an abrupt change in network time synchronization among nodes of the network.

18. The method of claim 15, including applying a collision avoidance protocol for nodes desiring to transmit messages during the NACK zone of the network timing frame.

19. The method of claim 15, including monitoring for requests for retransmission of unsuccessfully received data packets during the NACK zone of the network timing frame, at the nodes that originated the data packets during the DATA zone of a prior timing frame.

20. The method of claim 19, including implementing a MAC data unit (MDU) retransmission operation when the requests for retransmission of unsuccessfully received data packets are not received at the nodes that originated the data packets.

21. A method of providing medium access control (MAC) for a multiuser detection (MUD) enabled wireless ad hoc network, comprising:
    defining a TDMA network timing frame;
    allocating a first or data (DATA) zone in the network timing frame having one or more time slots structured to support multiuser detection (MUD) of concurrent transmissions by nodes of the network during each slot;
    structuring at least one time slot in the DATA zone to support multiuser detection (MUD) to decode multiple users from concurrent data transmissions received in a same time slot;
    allocating a second or negative acknowledgment (NACK) zone in the timing frame during which nodes transmit requests for retransmission of packets destined to but not successfully received;
    allocating a third or broadcast (BC) zone in the timing frame during which network management messages are broadcast to the nodes;
    allocating a fourth or control (CTRL) zone in the timing frame during which nodes exchange control messages with one another;
    selecting a primary master (PM) node and operating the PM node as a source of network time for all the nodes, wherein each node synchronizes its time to that of the PM node during the CTRL zone in a distributed manner by exchanging control messages with the PM node or other nodes located one or more hops from the PM node; and electing a new PM node only among one-hop neighbors of a current PM node when the current PM node moves outside of the network.

22. The method of claim 21, including handing off or changing the current PM node to the node having the lowest ID among one-hop neighbors of the current PM node.

* * * * *